(12) United States Patent
Koo

(10) Patent No.: US 8,746,627 B2
(45) Date of Patent: Jun. 10, 2014

(54) ACTUATOR FOR CONTROL LOADING SYSTEM

(75) Inventor: Chil Hyo Koo, Jeonju (KR)

(73) Assignee: BAROTech Synergy Co., Ltd., Jeonju (KR)

(*) Notice: Subject to any disclaimer, the term of this patent is extended or adjusted under 35 U.S.C. 154(b) by 387 days.

(21) Appl. No.: 13/161,347

(22) Filed: Jun. 15, 2011

(65) Prior Publication Data

US 2011/0314952 A1 Dec. 29, 2011

(30) Foreign Application Priority Data

Jun. 24, 2010 (KR) .................. 10-2010-0060209

(51) Int. Cl.
*B64C 13/04* (2006.01)
*B64C 13/24* (2006.01)
*G09B 9/08* (2006.01)
*G09B 9/28* (2006.01)

(52) U.S. Cl.
USPC .............................. 244/228; 244/223; 434/45

(58) Field of Classification Search
USPC ............ 244/220, 221, 223, 228, 99.3; 434/45
See application file for complete search history.

(56) References Cited

U.S. PATENT DOCUMENTS

| 2,937,458 | A | * | 5/1960 | Leuthold .......................... 434/45 |
| 4,710,128 | A | | 12/1987 | Wachsmuth et al. |
| 4,713,007 | A | * | 12/1987 | Alban .............................. 463/37 |
| 5,209,661 | A | * | 5/1993 | Hildreth et al. ................. 434/45 |
| 7,249,458 | B2 | | 7/2007 | Arbel et al. |
| 2010/0025539 | A1 | * | 2/2010 | Hanlon et al. ................. 244/223 |

FOREIGN PATENT DOCUMENTS

| JP | 2000-176761 A | 6/2000 |
| KR | 1020040018465 A | 3/2004 |
| KR | 1020040092108 A | 11/2004 |
| KR | 100851232 B1 | 1/2008 |
| KR | 1020090061508 A | 6/2009 |

* cited by examiner

*Primary Examiner* — Rob Swiatek

(57) ABSTRACT

An actuator which can be installed in a system for the virtual simulation of aircraft, ships and vehicles to help the system with the controls. More specifically, the invention is an actuator used for a control loading system, which can be installed into a virtual simulation system, receive force delivered by the movement of a control stick laterally while measuring the applied force. It can connect a lever which delivers the control force equivalent to the applied force and reaction force by making use of a direct drive motor, including a potentiometer which senses the angle of rotation while sensing the initial reference position separately from an encoder, limiting the rotation range of the rotating lever, fixing the initial neutral position, and the control loading system for actuators manufactured compactly on the whole.

4 Claims, 5 Drawing Sheets

ACTUATOR FOR CONTROL LOADING SYSTEM

TECHNICAL FIELD

This invention is an actuator which can be installed in a system for the virtual simulation of aircraft, ships and vehicles help the system with the controls. More specifically, the invention is an actuator used for a control loading system, which can be installed into a virtual simulation system; receive force delivered by the movement of a control stick laterally while measuring the applied force. It can connect a lever which delivers the control force equivalent to the applied force and reaction force by making use of a direct drive motor, including a potentiometer which senses the angle of rotation while sensing the initial reference position separately from an encoder, limiting the rotation range of the rotating lever, fixing the initial neutral position, and the control loading system for actuators manufactured compactly on the whole.

BACKGROUND OF TECHNOLOGY

Virtual simulation system is commonly used for the training of aircraft, ship, vehicle or other heavy equipment control with sufficient reality to ensure that trainees become fully immersed in the training with a similar feel, appearance and movements as in actual operations.

In particular, a control stick (cyclic stick), side stick or footrest-type pedal should give trainees a realistic experience, so that they can feel as if they are actually operating the equipment. Hereafter, the controlling device which the trainee directly operates will be called the control stick.

During the actual piloting of an aircraft, when the control stick is manipulated there is a reaction force that occurs mechanically from each of the connected parts, the reaction force resulting from those moving parts is felt along with the reaction force from the aerodynamic force that is felt in the hand of the pilot. Such a reaction force is called control force. Accordingly, when training with virtual simulation systems, actuators are installed which apply artificial control force to the control sticks to feel the force.

As exiting techniques for actuators, there are Korea Public Patent No. 10-0851232, Korea Public Patent No. 10-2004-0092108, Korea Public Patent No. 10-2009-0061508, Korea Public Patent No. 10-2004-0018465 and others, the above existing techniques are configured to provide control force by mechanically connecting a motor with a control stick and controlling the motor by manipulating the control stick.

However, with a complicated configuration of the mechanical means of linking control sticks with the motor, the said existing techniques are complicated with the installation structure and cannot keep the motors horizontal, which brings about an unwanted force being applied to the motors by the weight of the control sticks or the means of linking. This problem keeps one from accurately adjusting the control force when manipulating the motors to apply the control force.

Moreover, Korea Public Patent No. 10-0851232, Korea Public Patent No. 10-2009-0061508 and Korea Public Patent No. 10-2004-0018465 include a reducer, a pulley or a belt in the means of linking, which generates errors in the transmission of force. Meaning that if one pair of gears engages configuring the reducer, a backlash would occur in between the gaps, and the pulley would around a belt becomes loose after extended use and would spin with no traction. In addition, Korea Public Patent No. 10-2004-0092108 is unaffected from the said problem because it connects the motor directly with the axis of rotation, but the because of the limits to the mounting structure of the motor it can only be applied to the virtual simulation system of limited application.

Also, the above existing techniques use the rotor of the rotation angle by sensing the location sensor or sensing the rotation angle by the built-in encoder, however, in order to set the absolute reference point only with a single position sensor, they should bear start-up time delay and inconvenience in that start-up time needs to be established with software whenever the virtual simulation system is turned on.

And though it is desirable to determine the magnitude of the force applied to an actuator as the control stick is manipulated so as to calculate the control force corresponding to the movement of the control stick, the said preceding arts do not include any force sensors and if one can be accommodated, the installation location is not proper and the magnitude of the force cannot be measured accurately because of their structure.

PRIOR TECHNOLOGY REFERENCES

Patent References (Patent Reference 1) KR 10-0851232 B1, 2008 Aug. 7.
(Patent Reference 2) KR 10-2004-0092108 A, 2004 Nov. 3.
(Patent Reference 3) KR 10-2009-0061508 A, 2009 Jun. 16.
(Patent Reference 4) KR 10-2004-0018465 A, 2004 Mar. 3.

DISCLOSURE

Technical Problem

Accordingly, the first goal of the present invention is to provide an actuator for the control loading system, which can laterally transmit force from a control stick and the control force applied to the control stick by direct connection without any means of transmission such as reducer or belt and to allow for the convenient, mechanical linking with a control stick.

The second goal of the present invention is to provide an actuator for the control loading system, which is capable of sensing the angle of rotation, set the absolute reference point of the rotation angle accurately and readily, and be used continuously once it has been established regardless of suspension of a shutdown of the virtual simulation system.

The third goal of the present invention is to provide an actuator for the control loading system, which can have a force sensor that can be easily installed without any influence on the overall structure.

Technical Solution

In order to achieve the goals above, the present invention is characterized by an actuator for control loading system which consists of the DD motor (400) which has a stator, a rotor which electromagnetically interacts with the stator and rotates around the stator, and an encoder which senses the angle of rotation of the rotor, and fixes the stator in the stator body (420) of the lower part and the rotor in the rotor body (410) of the upper part; the fixture (300) which has the upper fixture (310) supporting the rotor body (410) of the DD motor (400), the lower fixture (320) supporting the stator body (420) of the DD motor (400), and the potentiometer (350) arranged in the direction of the pivot of the rotor body (410); the rotator (200) which has the lever (210) of which either end is fixed in the pivot on the top of the rotor body (410) and the other end rotates horizontally around it and the shaft rod (230) installed perpendicular to the pivot of the rotor body (410) and fixed on the shaft (351) of the potentiometer (350); and the force sensor (100) of which either end is combined with the end of the lever (210) for horizontal rotation and the other end is fixed so as to receive the force applied to the control stick (10) and generates electric signal according to the amount of deformation corresponding to the magnitude of the force applied.

The DD motor (400) has the hollow (430) which penetrates vertically the rotor body (410) and the stator body (420) in the direction of pivot, the potentiometer (350) is fixed in the lower fixture (320) to be placed in the bottom of the hollow (430), and the shaft rod (230) which penetrates the hollow (430) while the top is fixed in the rotor body (410) and the bottom is fixed in the shaft (351) of the potentiometer (350).

The upper fixture (310) of the fixture (300) penetrates vertically the center (312) to make the rotor body (410) rotate while the top is inserted into the center (312), the lever (210) of the rotator (200) is fixed on the top of the rotor body (410) to be exposed to the upper part of the upper fixture (310) and include the through hole (212) penetrating vertically near the other end, and the inserting groove (311) is formed on the surface of the upper fixture (310) in the vertical lower part of the through hole (212) in neutral state without force applied to the control stick (10).

The stopper (360) which limits the scope of rotation of the lever (210) is installed on the top of the upper fixture (310) and the pad (363) is attached to the surface contacting the other end of the lever (210).

Effects of Invention

Accordingly, the present invention, in line with what was mentioned above is not influenced by the weight of the means of linking with a control stick as it receives the force applied to a control stick laterally, and has no means of transforming and transmitting the rotation torque or velocity including a reducer, pulley or belt, but uses a direct drive motor so that when no force is applied to the control stick, it is capable of maintaining its neutral position and when there is force applied to the control stick, it can transmit the force accurately for operation without error.

The present invention can also sense the absolute reference position by the potentiometer, and when establishing the absolute position the lever is fixed allowing for the accurate absolute position to be established, therefore, the angle of rotation can be determined by the encoder based on the accurate absolute position.

In addition, with a force sensor installed at the front end of the lever, the present invention can easily be mounted and manufactured compactly and is capable of determining the magnitude of the force accurately.

BEST MODE FOR INVENTION

Below, desirable embodiments of the present invention will be described in detail with reference to the attached figures so that those who have common knowledge of the relevant field can implement it easily. In the attached figures, caution should be taken so that as much as possible the same reference numbers used for configuration or operation also be used when marking the configuration or operations in other figures. In addition, in a case where a detailed account of relevant publicly known function or configuration may unnecessarily obscure the gist of the present invention unnecessarily, such a detailed account will be omitted.

Figure 1:
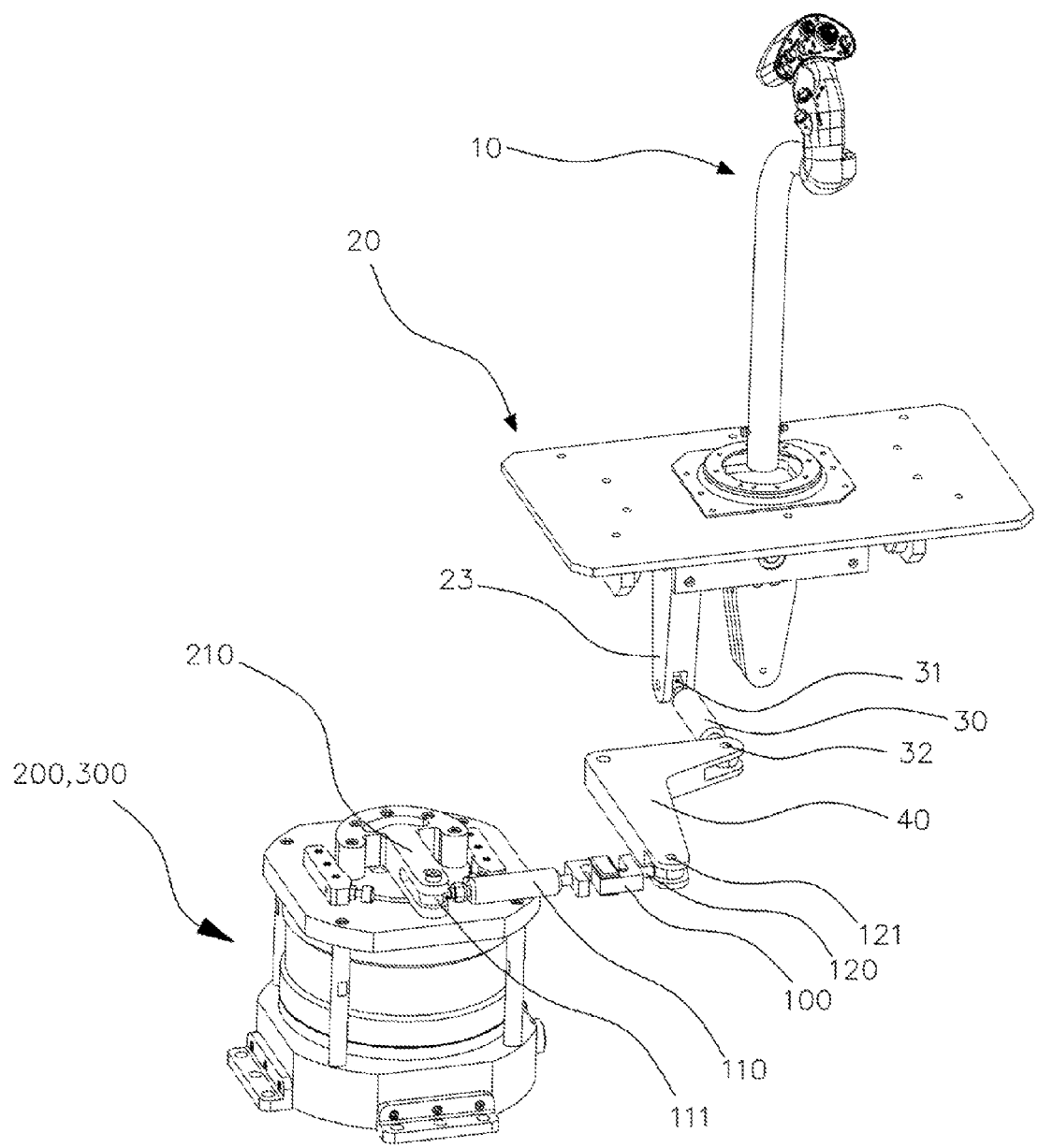
FIG. 1 is an oblique view from above the actuator for the control loading system according to the embodiment of the present invention, which is connected to the control stick (10).

FIG. 1 is an oblique view from above the actuator for the control loading system according to the embodiment of the present invention, which is connected to the control stick (10).

Figure 2:
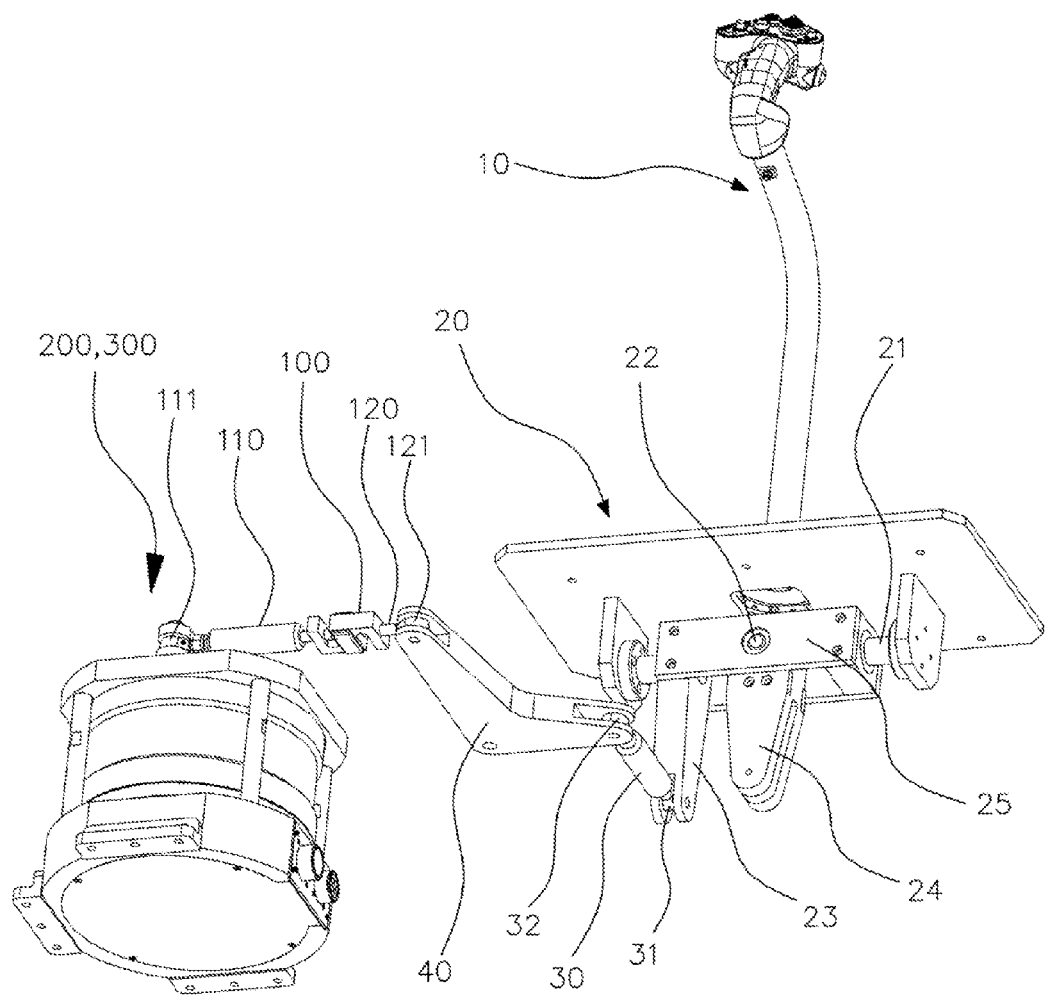
FIG. 2 is an oblique view from below the actuator for the control loading system according to the embodiment of the present invention, which is connected to the control stick (10).

FIG. 2 is an oblique view from below the actuator for the control loading system according to the embodiment of the present invention, which is connected to the control stick (10).

An actuator for the control loading system according to the present invention, as described below, consists of a force sensor (100), a rotator (200), a fixture (300), and a direct drive motor (hereinafter referred to as "DD motor") (400) and receives the force generated by the movement of the control stick (10) through the force sensor (100), as shown in said FIG. 1 and FIG. 2.

First, for better understanding of the present invention, a brief description of the control stick (10) and a gimbal (20) in which said control of the stick (10) is given as follows: the control stick (10) is installed at the top of the gimbal (20) so that it can be controlled by applying a lateral movement (rolling) and a forward-backward (pitching) movement. The axis of rotation (22) of an operating stick (24) rotating by lateral movement is installed in a member (25) rotating around another axis of rotation (21) for another operating stick (23) fixed on said member (25) to rotate. At this time, said both operating sticks (23, 24) have the lower parts rotate while the upper parts are fixed on the pivot. And actuators are connected with said both operating sticks (23, 24), respectively, so as to sense movement of the control stick (10) and apply reaction force generated by the movement of the control stick (10) to the control stick (10). Further, the control stick (10) can move only in a pitching movement, in which case only one actuator can be installed. Furthermore, an actuator can be installed using a piloting method such as footrest-type pedals or side sticks, too, instead of those of the stick type shown in said FIG. 1 and FIG. 2.

Because the present invention relates to an actuator connected to such means controlled by trainees as control sticks, pedals or side sticks, it should be noted that the control stick (10) applied in the embodiment of the present invention is representative of the various control means.

As an embodiment of the present invention, FIG. 1 and FIG. 2 show that the present invention receives the force applied to the control stick (10) as the rotation force of the operating sticks (23, 24) and makes the trainees feel the reaction force corresponding to the said rotation force at the control stick (10) through the operating sticks (23, 24).

Note that for the sake of convenience, it is shown that an actuator for the control loading system according to the present invention is connected with only one operating stick (23).

Meaning, an actuator for the control loading system according to the embodiment of the present invention receives the rotation force of the operating stick (23) through a rod (30) and link (40) at the force sensor (100). Particularly, one end of the rod (30) is combined with a bearing (31) at the bottom of the operating stick (23) to rotate vertically around a horizontal pivot and one end of an L-link (40) is combined with a bearing (32) at the other end of the rod (30) to rotate horizontally around a vertical pivot, and the other end of the link (40) is combined with a bearing (121) of the force sensor (100) of an actuator for the control loading system according to the present invention to ensure that is perpendicular with the pivot. At this time, to achieve the combination of the said force sensor (100) and the said link (40), a coupling rod (120) is combined with the other end of the link (40) through the bearing (121) is added for the fitting combination of the said force sensor (100) of the coupling rod (120).

In this way, an actuator for the control loading system according to the present invention is combined with the control stick (10) and the gimbal (20) to laterally transform and receive the force applied to the control stick (10) and configured to laterally receive the force applied to a force sensor (100) through the movement of a control stick (10). And as described below, the lever (210) of the rotator (200) is configured to rotate laterally around a vertical pivot so that no force is applied to the force sensor (100) when there is no force applied to the control stick (10). Eventually, if the control stick (10) is not moved a neutral state can be maintained without pitching.

This is because if the lever (210) of the rotator (200) described later rotates vertically around a horizontal pivot by the force applied to the force sensor (100), even though it is in a neutral state without force applied to the control stick (10), the lever (210) is hung downwards by the weight of the rod (30) and link (40), thereby an actuator operates as if it is controlled.

Therefore, in order to avoid operating in a neutral state, the present invention is configured to receive the force horizontally and thereby the lever (210) of the rotator (200) rotates around a vertical pivot.

Meanwhile, the configuration which transmits the force applied to operating sticks (23, 24) of the gimbal (20) to the present invention is not limited to the configuration of the rod (30) and link (40). The rod (30) may be directly connected with the force sensor (100) by bearing combination, except the link (40), or any configuration that substitutes for the link (40) may be installed. Therefore, the present invention can be connected with the control stick in various forms of connection depending upon position or application.

In the embodiments shown in FIG. 1 and FIG. 2, for the operating sticks (23, 24) of the gimbal (20), the lower part rotates around the pivots (21, 22) of the upper part and the rod (30) moves slightly longitudinally. Therefore, it is desirable to install one of the bearings (31, 32, 121) with clearance.

Figure 3:
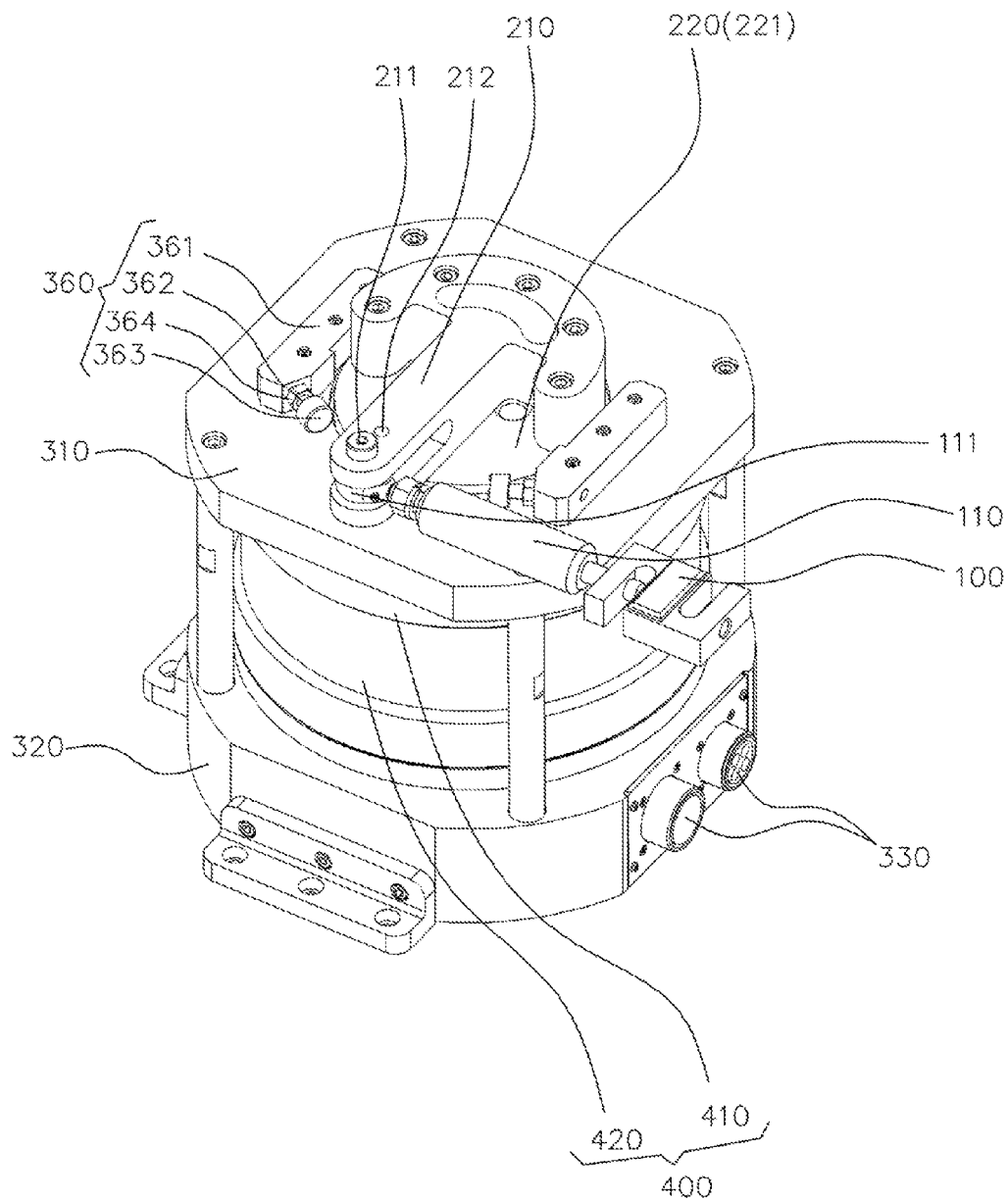
FIG. 3 is an oblique view from above the actuator for the control loading system according to the embodiment of the present invention.

FIG. 3 is an oblique view from above the actuator for the control loading system according to the embodiment of the present invention.

Figure 4:
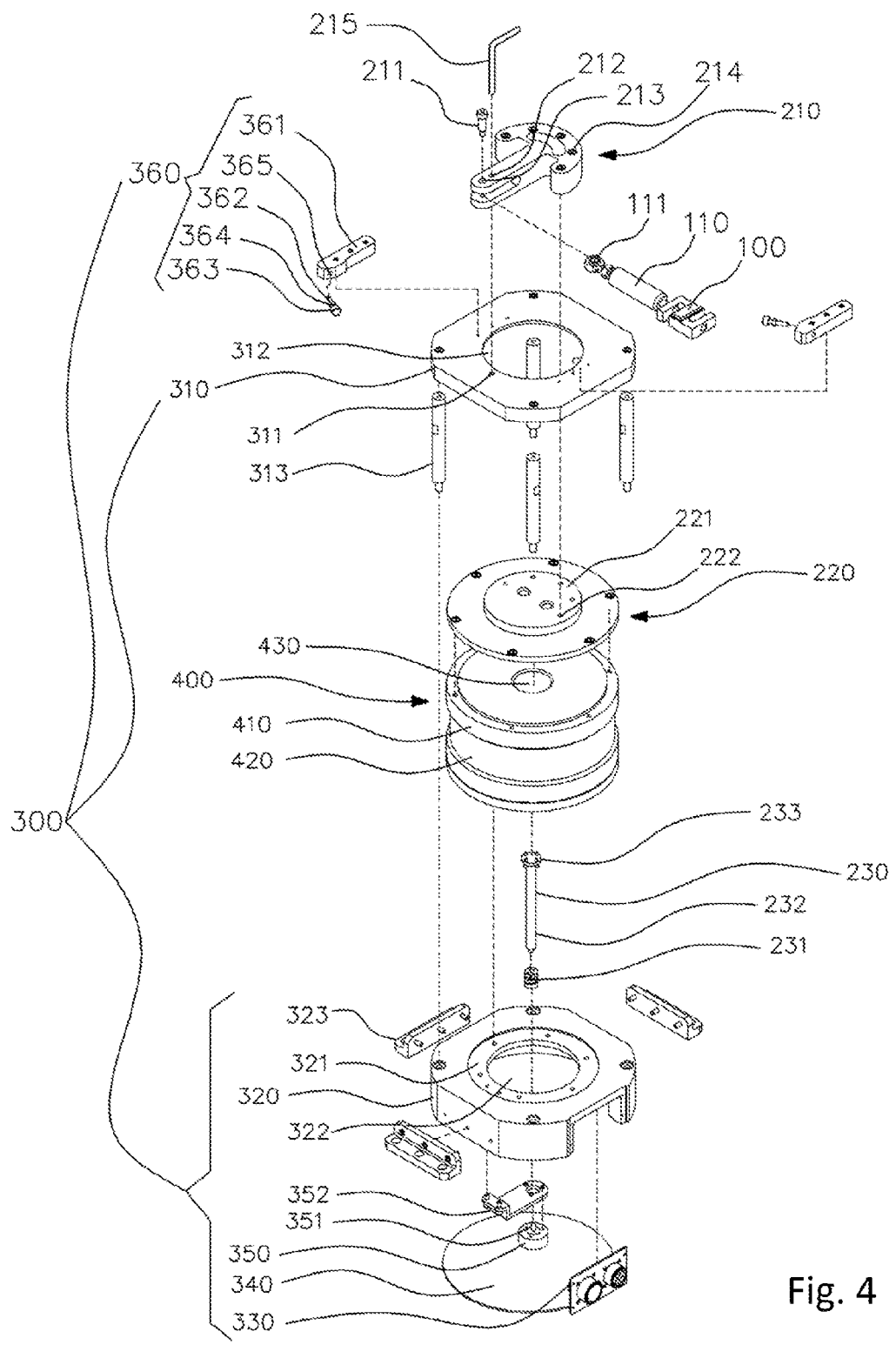
FIG. 4 is an exploded oblique view from above the actuator for the control loading system according to the oblique view of the present invention.

FIG. 4 is an exploded oblique view from above the actuator for the control loading system according to the oblique view of the present invention.

Figure 5:
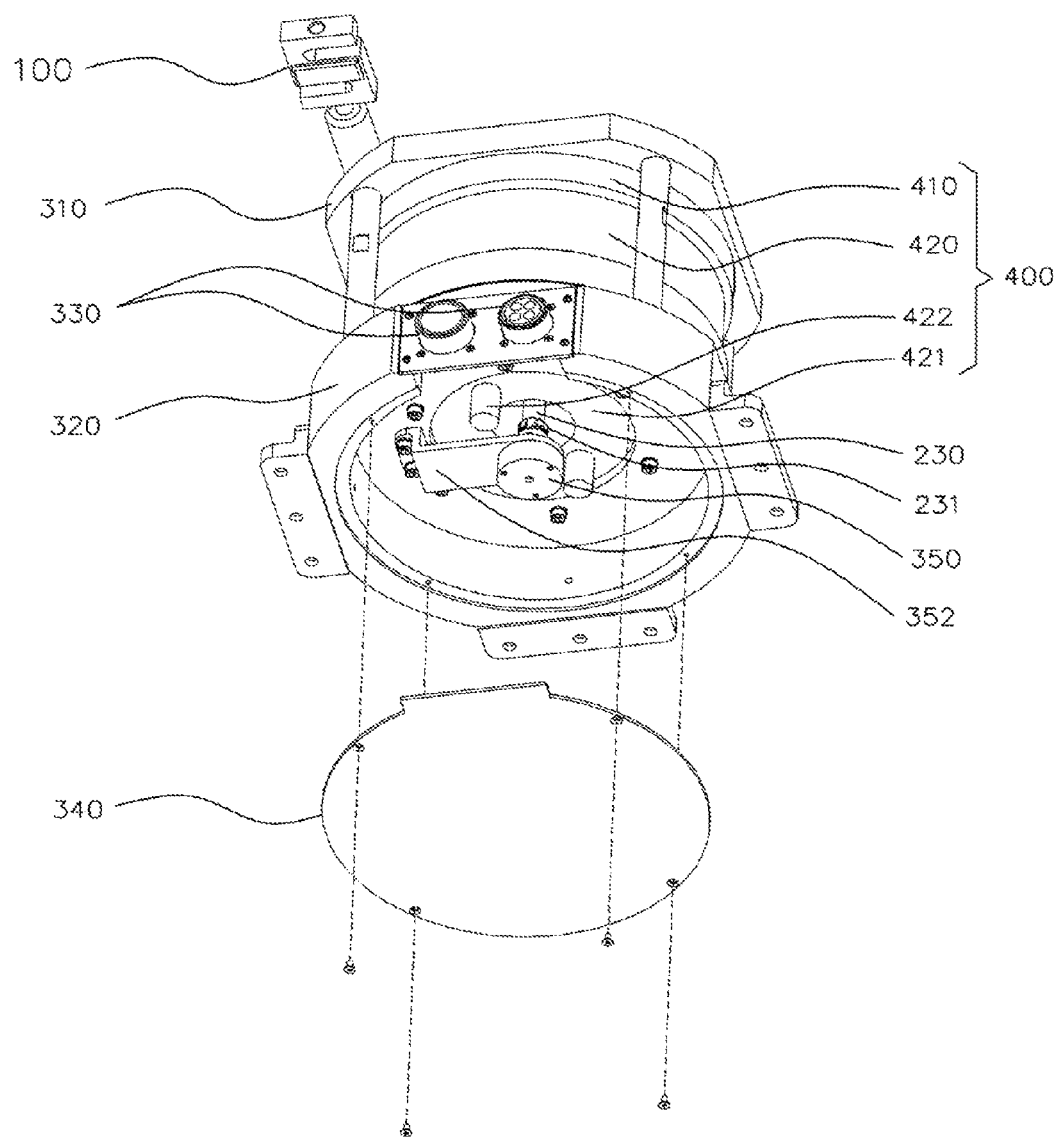
FIG. 5 is an oblique view from below the actuator for the control loading system according to the embodiment of the present invention.

FIG. 5 is an oblique view from below the actuator for the control loading system according to the embodiment of the present invention.

First, note that for FIG. 4, since multiple bolts are used to make a connection, in the light of the complexity of the figure, the bolt-connection of one configuration and another is drawn using a dashed line, provided that in case of multiple bolt-connections, only one of them is drawn using a dashed line.

As shown in the figures, an actuator for the control loading system according to the present invention consists of the rotator (200) which receives the control force from the control stick (10) rotates around a vertical pivot, the force sensor (100) which is installed on the transmission path of the control force of the control stick (10) to the rotator (200) and transmits a signal corresponding to the magnitude of the control force, the DD motor (400) which rotates by the rotator (200) and provides control force (reaction force), and the fixture (300) which supports said DD motor (400).

The DD motor (400) above is a direct drive motor which has a stator (not shown), a rotor (not shown) which electromagnetically interacts with said stator and rotates around said stator, and an encoder (not shown) which senses the angle of rotation of the rotor, and is configured so that a rotor body (410) which supports a rotator installed in the upper part can rotate around a stator body (420) which supports a stator installed in the lower part. And as shown in FIG. 5, an outlet (422) through which electric wire (not shown) and the control wire (not shown) that can be removed are located at the bottom of the stator body (420). And such a rotation is controlled by an external controller (not shown) and the angle of rotation sensed by an encoder is transmitted to the external controller (not shown).

Since the configuration of this kind of DD motor (400) is publicly known, a detailed description for the internal configuration is omitted. However, in the present invention, while the stator body (420) of the DD motor (400) is securely fixed on a fixture (300) and the rotor body (410) is supported so as to rotate around the fixture (300), said rotator (200) is fixed on the rotor body (410) of said DD motor (400). Therefore, the force transmitted to the rotator (200) is directly transmitted to the rotor body (410) of said DD motor (400) without passing such means that transforms and delivers force as a reducer or belt. As the operation of the DD motor (400) is controlled by the external controller (not shown), the reaction force applied to said rotor body (410) is directly applied to the rotator (200) without forcing any means of transmission.

Also, said DD motor (400) includes a hollow (430) which penetrates vertically the rotor (410) and the stator body (420) in the direction of pivot, thereby takes the form of vertical penetration. The center of plane section of said hollow (430) becomes a pivot.

The fixture (300) consists of an upper fixture (310) which supports the rotor body (410) of said DD motor (400) to allow it to rotate, a lower fixture (320) which fixes the stator body (420) of said DD motor (400) to keep it steady, and a potentiometer (350) which is installed in the direction of a pivot of said rotor body (410) and fixed on said lower fixture (320).

Specifically, the upper fixture (310) is in the form of a slab which has a centre (312) with a hollow. In the embodiment of the present invention, a rotating disc (220) of the rotator (200) is fixed on the top of the rotor body (410) of said DD motor (400) and said rotating disc (220) is installed in said center (312) for said DD motor (400) to rotate.

Said lower fixture (320) has internal space to accommodate the potentiometer (350) and to electrically connect with said DD motor (400). A lower cover (340) is used to block the lower part and a connector (330) is installed in either side to electrically connect to the external controller (not shown) and a clamp (323) is mounted on the lateral surface to be securely fixed on the frame (not shown). In addition, for said lower fixture (320), a crater (322) is formed on the top and said potentiometer (350) is placed in the bottom of the hollow (430) of said DD motor (400) and fixed on said lower fixture (320) using a support (352) so that said DD motor (400) can be securely fixed on the upper side (321) of said lower fixture (320) and electric line (not shown) and control line (not shown) can be drawn from said DD motor (400), while a shaft rod (230), which is to be described below, penetrating through the hollow (430) of said DD motor (400) can be fixed on a shaft (351) of said potentiometer (350).

And while said DD motor (400) is installed between said upper fixture (310) and lower fixture (320), multiple long bolts (313) are used to connect them around the edge.

Said potentiometer (350) is configured so that when a shaft (351) which is installed to protrude rotates, the analog signal corresponding to the angle of rotation is given out. The present invention makes the position where the control stick (10) is not moving but in neutral, that is, the initial position of a rotator (200) recognized as the absolute reference position sensed by the analog output signal from said potentiometer (350).

Said rotator (200) consists of the lever (210) which rotates as the control stick (10) moves, a shaft rod (230) which is inserted into the hollow (430) of said DD motor (400) and fixed on the shaft (351) of said potentiometer (350), and a rotating disc (220) which fixes said lever (210) and shaft rod (230) on the rotor body (410) of said DD motor (400) and supports a rotor body (410) so that it can rotate around said upper fixture (310).

Specifically, said rotating disc (220) is shaped like a disc and fixed on the top of said rotor body (410). In addition, it has an inserting disc (221) protruding in the form of a disc fitting to the rim of the center (312) of said upper fixture (310) so that said rotor body (410) is supported by said upper fixture (310) and rotates while said inserting disc (221) is inserted into said center (312).

Said lever (210) is placed horizontally and fixed on the position of the pivot of said rotor body (410) of said inserting disc (221) at one end and receives the force applied to a control stick (10) at the other end. Then, said lever (210) can rotate while being exposed to the upper part of said upper fixture (310).

The shaft rod (230) is fixed on the position of the pivot of the rotor body (410) in the bottom of the rotating disc (220) downwards and inserted into the hollow (430) of the DD motor (400). Then, the lower part of the shaft rod (230) and the shaft (351) of the potentiometer (350) are connected through a coupling rod (231).

In the configuration of the rotator (200), when the lever (210) rotates horizontally, the rotor body (410) of the DD motor (400) fixed on a rotating disc (220) also rotates, and when control force (reaction force) is applied to the DD motor (400), the force is applied to the rotor body (410) and transmitted to the lever (210), and in turn, to a control stick (10). As the torque of the lever (210) is transmitted to the shaft (351) of the potentiometer (350) via the shaft rod (230), the potentiometer (350) can sense the torque.

The force sensor (100) is installed between the link (40) which transmits the force applied to the control stick (10) and one end of the lever (210) to deliver the force applied to the control stick (10) to the lever (210) and sense the magnitude of the force delivered. It is desirable that the force sensor (100) consists of load cell which can measure shape displacement vector by converting it into electrical signal value.

In the embodiment of the present invention, the force sensor (100) is installed in one end of the lever (210) by bearing (211, 111) combination with a connecting rod (110) which rotates horizontally around a vertical pivot and the force sensor (100) which is fixed on the end of the connecting rod (110). Then, the link (40) is connected to the opposite side of the area where the connecting rod (110) is installed. The combination of the connecting rod (110) and the lever (210) using the bearing (111) is such that the bearing (111) with a vertical pivot is installed at the end of the connecting rod (110), a cut groove is formed horizontally at the end of the lever (210), a through hole (213) is created on the top and the bottom of the cut groove and the bearing (111) is inserted into the cut groove and fastened with the bolt (211) through the through hole (213).

Likewise, the force sensor (100) installed is fixed on the connecting rod (110) and receives the force applied to the control stick (10), whereby it is deformed according to the magnitude of the force applied. At this time, electric signal proportional to deformations is generated and delivered to the external controller (not shown).

Meanwhile, in the embodiment of the present invention, in order to accurately sense the initial rotation position using the potentiometer (350) in neutral state where the control stick (10) does not move, that is, initial state where no force is applied to the lever (210), a through hole (212) penetrating vertically is made in the lever (210) and an inserting groove (311) is made on the top of the upper fixture (310) which corresponds to the vertical lower part of the through hole (212) in initial, neutral state.

In this way, when establishing the initial state, a separate pin (215) penetrates the through hole (212) and it is inserted into the inserting groove (311) for the lever (210) to stop rotating. Then, analog signals from the potentiometer (350) are used to establish initial state. After completing to establish initial state, remove the pin (215) for the lever (210) to resume rotation by movement of the control stick (10).

Also, according to the embodiment of the present invention, a stopper (360) which physically limits the range of rotation of the lever (210) is installed on either side of the top of the upper fixture (310).

The stopper (360) is installed on either side of the top of the upper fixture (310) corresponding to the angle of rotation which is determined according to the range of rotation of the lever (210) based on the neutral position of the lever (210). And stoppers (360) consists of a stopper body (361) which is fixed on the top of the upper fixture (310), a rod (362) which is fixed on the side touching the lever (210) using a nut (364), and a pad (363) which is fixed on the end of the rod (362). The pad (363) acts as a buffer against touch with the lever (210) rotating.

Therefore, the stopper (360) limits the maximum range of the angle or rotation of the lever (210) when the control stick (10) tries to deviate from the range of the rotation angle limited by software with excessive force applied even though the rotation angle of the lever (210) is limited by software with the control force (reaction force) applied to the DD motor (400) according to the control of the external controller (not shown).

An actuator for control loading system according to the present invention, as shown in FIGS. 1 and 2, is mechanically connected with the control stick (10) by the link (40), the rod (30) and the gimbal (20) and is electrically connected to the external controller (not shown) for the simulation system which loads the control force to run and is used as follows.

First, in order to set initial state where the control stick (10) does not move, insert the pin (215) into the through hole (212) of the lever (210) and the inserting groove (311) of the upper fixture (310) and fix it on the upper fixture (310) for the lever (210) to stop rotating and use analog signals from the potentiometer (350) to establish initial central position.

Then, remove the pin (215) for an actuator for control loading system to operate according to the force delivered by the control stick (10) and the control of the external controller (not shown).

Meaning, when the lever (210) receives the force generated by the movement of the control stick (10) and rotates, the force sensor (100) senses and transmits the force to the external controller (not shown). The rotor body (410) of the DD motor (400) senses the angle of rotation using an encoder (not shown) built in the DD motor (400) and delivers it to the external controller (not shown). Then, the external controller (not shown) converts the magnitude of the force to obtain target position using a predetermined model consisting of acceleration, speed and position components and uses them as data required for simulation based on the obtained target position.

In addition, the external controller (not shown) controls the DD motor (400) so that the control force (reaction force) which corresponds to acceleration, speed and position according to the magnitude of the force is applied through an actuator of the present invention. Meaning, the external controller (not shown) calculates the rotation force to be applied to the rotor body (410) of the DD motor (400) based on acceleration, speed and position components determined by the magnitude of the force and makes the rotor body (410) of the DD motor (400) rotate, provided that based on the angle of rotation sensed through the encoder (not shown), it adds or subtracts variations of rotation position, rotation speed and rotation force to generate the target control force as the rotation force of the DD motor (400).

At this time, the driving rotation force of the DD motor (400) corresponds to the control force which acts as a reaction force when a control stick is moved, not in a virtual simulation system, but in real aircrafts or ships and is felt through the control stick.

In this way, the present invention which can be used in simulation system can set the initial central position using the potentiometer (350) which has no changes in signal at the initial central position even though power is disconnected and connected, so there is no need to repeat the initial setup work. s Besides, since the lever (210) can be fixed using the through hole (212) of the lever (210) and the inserting groove (311) of the upper fixture (310), the initial central position can be set accurately.

Also, since the present invention senses the angle or rotation of the lever (210) using the encoder (not shown) of the DD motor (400) based on the set initial central position, it can obtain the target control position and the control force using the accuracy of digital signal from the encoder (not shown). That is, because the encoder (not shown) senses the angle or rotation with digital signal, it has no noise and outstanding resolution and can sense the operation of the DD motor (400) accurately and supplements the weakness of the encoder (not shown) which has to set reference point whenever power is connected and sets the initial central position using a potentiometer (350). Meanwhile, since a potentiometer (350) senses the position using analog signal with much noise, the present invention is used only to setup the initial central position.

In this way, the present invention operates the encoder (not shown) of the DD motor (400) and the potentiometer (350) of the fixture (300) in combination to obtain the accurate target control position and the control force.

Also, the present invention makes the lever (210) rotate while maintaining level and prevents unwanted force by the weight of the links (30, 40) which mechanically connect the operating sticks (23, 24) of the gimbal (20) linked with the control stick (10) to the lever (210), so there is no need to install a separate ballast to compensate the weight of the links (30, 40) and the accurate control power can be loaded by transmitting only the force according to the movement of the control stick (10).

The present invention can also have the force sensor (100) installed at the front end of the lever (210) to which the movement of the control stick (10) is delivered, instead of having the force sensor (100) installed in the inside consisting of the rotator (200), the fixture (300) and the DD motor (400) and be manufactured compactly and measure the force applied to the lever (210) accurately.

The present invention can also use the DD motor (400) consisting of a direct drive motor and have no auxiliary means such as reducer or power transfer unit consisting of pulley and belt and enhancing power transfer without requiring to be equipped with the auxiliary means of a driveline. Meaning, while the auxiliary means mentioned above transfer rotation force by adjusting rotation torque or rotation speed and has energy loss in the transfer process of rotation force, the present invention has no such auxiliary means and can deliver rotation force accurately without decline of rotation force. Besides, the present invention has no errors due to backlash or loose pulley and can receive the movement of the control stick (10) and deliver the control force to the control stick (10) accurately.

The present invention also limit the range of rotation of the lever (210) by the DD motor (400) driven by the external controller (not shown) with software and even though it goes out of bounds with software by an unreasonable operation, it can limit the rotation range of the lever (210) using the stopper (360) and prevent damage by excessive operations.

As mentioned above, the present invention is illustrated with embodiments to describe technical philosophy, but the present invention is not limited to the configuration and operation same as the above embodiments but many variations can be used within the scope of the present invention. Therefore, such variations should be regarded as belonging to the scope of the present invention and the scope of the present invention should be determined by the description of the scope of patent request.

EXPLANATION OF MARKS

10: control stick 20: gimbal 21, 22: axis of rotation
23, 24: operating stick 30: rod 31, 32: bearing
40: link
100: force sensor 110: connecting rod 111: bearing
120: connecting rod
200: rotator 210: lever 211: bolt
212: crater 220: rotating disc 221: inserting disc
230: shaft rod 231: coupling
300: fixture 310: upper fixture 311: inserting groove
320: lower fixture 330: connector 340: lower cover
350: potentiometer 351: shaft 352: support
360: stopper 361: stopper body 362: rod
363: pad 364: nut
400: DD motor 410: rotor body 420: stator body
430: hollow

What is claimed is:
1. An actuator for a control loading system comprising:
a direct drive motor including
a stator,
a rotor configured to rotate around the stator and to interact with the stator electrically, and an encoder configured to sense an angle of rotation of the rotor, wherein the stator is fixed in a stator body and the rotor is fixed in a rotor body;

a fixture including an upper fixture supporting the rotor body of the direct drive motor, a lower fixture supporting the stator body of the direct drive motor, and a potentiometer arranged in a rotation axis in the direction of the rotor body; and a rotator including a lever having a first end fixed at a pivot on a top of the rotor body and a second end configured to rotate horizontally around the pivot, a shaft rod installed perpendicular to the rotor body and having a bottom end fixed on a shaft of the potentiometer; and a force sensor having a first end connected to the lever for horizontal rotation and a second end configured to receive a force applied to a control stick, wherein the force sensor generates an electric signal according to an amount of deformation corresponding to the magnitude of the applied force.

2. The actuator for a control loading system according to claim 1, wherein the direct drive motor further includes a hollow vertically penetrating the rotor body and the stator body in the direction of the shaft rod, and the potentiometer is located in a lower part of the hollow, and the shaft rod penetrates the hollow, wherein the shaft rod has an upper end fixed to the rotor body.

3. The actuator for a control loading system as in according to claim 2, wherein the upper fixture further includes an open center into which a portion of the rotor body extends through to freely rotate, the lever of the rotor disposed on top of the rotor body and further includes a through hole vertically penetrating the lever, and an inserting groove is formed on the upper surface of the upper fixture, said inserting groove aligned with the through hole when in a neutral state without a force applied to the control stick.

4. The actuator for a control loading system as in according to claim 3, further comprising a stopper installed on the upper surface of the upper fixture, wherein the stopper is configured to limit the rotation of the lever, and wherein the stopper includes a pad that contacts the lever.

* * * * *